(12) United States Patent
Minami et al.

(10) Patent No.: US 10,302,372 B2
(45) Date of Patent: May 28, 2019

(54) PLATE FIN HEAT EXCHANGER AND MANUFACTURING METHOD FOR HEAT EXCHANGER CORRUGATED FINS

(71) Applicant: SUMITOMO PRECISION PRODUCTS CO., LTD., Amagasaki-shi, Hyogo (JP)

(72) Inventors: Takeo Minami, Hyogo (JP); Kenta Kanemura, Hyogo (JP); Shigeru Aoki, Hyogo (JP); Hideki Shigemori, Hyogo (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 327 days.

(21) Appl. No.: 15/116,790

(22) PCT Filed: Feb. 12, 2015

(86) PCT No.: PCT/JP2015/000631
§ 371 (c)(1),
(2) Date: Aug. 4, 2016

(87) PCT Pub. No.: WO2015/122185
PCT Pub. Date: Aug. 20, 2015

(65) Prior Publication Data
US 2016/0348987 A1    Dec. 1, 2016

(30) Foreign Application Priority Data
Feb. 14, 2014 (JP) ................................. 2014-026203

(51) Int. Cl.
*F28F 3/02* (2006.01)
*B23K 1/00* (2006.01)
(Continued)

(52) U.S. Cl.
CPC ............ *F28F 3/025* (2013.01); *B21D 53/022* (2013.01); *B21D 53/04* (2013.01); *B23K 1/008* (2013.01);
(Continued)

(58) Field of Classification Search
CPC .... F28F 3/025; F28F 3/02; F28F 1/126; F28F 13/12; F28F 13/06; B21D 53/022;
(Continued)

(56) References Cited

U.S. PATENT DOCUMENTS 2,488,615 A * 11/1949 Arnold ...................... F28F 1/40
138/38
4,067,219 A * 1/1978 Bianchi .................. B21D 13/04
72/186
(Continued)

FOREIGN PATENT DOCUMENTS

CN    102322761    1/2012
CN    102770735    11/2012
(Continued)

*Primary Examiner* — Tho V Duong
(74) *Attorney, Agent, or Firm* — Maschoff Brennan

(57) ABSTRACT

A plate fin heat exchanger 1 includes a corrugated fin 3 and tube plates 2. An intermediate portion 33 of the corrugated fin between crest and trough portion 31 and 32 thereof has a plurality of protruding ribs 34 protruding beyond a surface of the corrugated fin and arranged in a first direction. Surfaces of the crest and trough portions being in contact with the tube plates are configured as contact surfaces 310, 320 with no protruding rib. Gently sloping portions 341 are provided between the protruding ribs and the contact surfaces of the crest and trough portions to gradually protrude from the surface of the corrugated fin with increasing distance from the contact surfaces, and are continuous with the protruding ribs.

3 Claims, 7 Drawing Sheets

(51) Int. Cl.
  *B23K 1/008*   (2006.01)
  *B23K 1/14*    (2006.01)
  *B23K 1/19*    (2006.01)
  *B21D 53/02*   (2006.01)
  *B21D 53/04*   (2006.01)
  *F28D 9/00*    (2006.01)
  *B23K 101/14*  (2006.01)
  *B23K 103/04*  (2006.01)
  *B23K 103/10*  (2006.01)

(52) U.S. Cl.
  CPC .............. *B23K 1/0012* (2013.01); *B23K 1/14* (2013.01); *B23K 1/19* (2013.01); *F28D 9/0062* (2013.01); *B23K 2101/14* (2018.08); *B23K 2103/05* (2018.08); *B23K 2103/10* (2018.08); *F28F 2215/10* (2013.01); *F28F 2275/04* (2013.01)

(58) Field of Classification Search
  CPC ...... B21D 53/04; B23K 1/0012; B23K 1/008; B23K 1/14; B23K 1/19; F28D 9/0062
  See application file for complete search history.

(56) References Cited

U.S. PATENT DOCUMENTS

| | | | | |
|---|---|---|---|---|
| 4,420,039 | A * | 12/1983 | Dubrovsky | F28F 13/08 165/152 |
| 6,874,345 | B2 * | 4/2005 | Stoynoff, Jr. | B21D 31/046 72/186 |
| 2004/0050538 | A1 | 3/2004 | Sunder et al. | |
| 2012/0318485 | A1 * | 12/2012 | Yabe | F28D 1/05383 165/152 |
| 2014/0360707 | A1 * | 12/2014 | Cho | F28F 13/06 165/165 |
| 2016/0327348 | A1 | 11/2016 | Yabe et al. | |

FOREIGN PATENT DOCUMENTS

| | | | |
|---|---|---|---|
| JP | S57-030585 U | 2/1982 | |
| JP | 01254377 A | * 10/1989 | ............. F28F 1/126 |
| JP | H02-007487 U | 1/1990 | |
| JP | 2004-108769 A | 4/2004 | |
| JP | 2011-089664 A | 5/2011 | |
| JP | 2012-017875 A | 1/2012 | |

* cited by examiner

PLATE FIN HEAT EXCHANGER AND MANUFACTURING METHOD FOR HEAT EXCHANGER CORRUGATED FINS

TECHNICAL FIELD

The present disclosure relates to a plate fin heat exchanger and a method for making a corrugated fin for use in a heat exchanger.

BACKGROUND ART

Patent Document 1 describes a heat exchanger including a corrugated fin. In this heat exchanger, fine asperities are formed on the entire surface of the corrugated fin to prevent a boundary layer of a fluid flowing along the surface of the corrugated fin from being developed, thereby improving the performance of the heat exchanger.

CITATION LIST

Patent Document

PATENT DOCUMENT 1: Japanese Unexamined Utility Model Publication No. H02-7487

SUMMARY OF THE INVENTION

Technical Problem

In the heat exchanger described in Patent Document 1, the corrugated fin and a flat tube are bonded together by brazing with the outer surface of the flat tube being in contact with the surfaces of crest or trough portions of the corrugated fin. However, since, as described above, fine asperities are formed on the surface of this corrugated fin, this uneven surface and the outer surface of the flat tube come into contact with each other. This unfortunately decreases the bonding strength between the corrugated fin and flat tube of the heat exchanger.

In view of the foregoing background, it is therefore an object of the present disclosure to increase the bonding strength of a corrugated fin of a heat exchanger.

Solution to the Problem

A plate fin heat exchanger disclosed herein includes: a corrugated fin having a crest portion having a crest line extending in a first direction, a trough portion having a trough line extending in the first direction, and an intermediate portion connecting the crest and trough portions together, the crest and trough portions being alternately arranged in a second direction orthogonal to the first direction; tube plates disposed to sandwich the corrugated fin therebetween, the tube plates being configured so as to be bonded to the corrugated fin while being in contact with respective surfaces of the crest and trough portions of the corrugated fin.

The intermediate portion of the corrugated fin has a plurality of ribs protruding beyond a surface of the corrugated fin, extending between the crest and trough portions, and arranged in the first direction, the surface of the crest portion being in contact with one of the tube plates and the surface of the trough portion being in contact with the other tube plate are configured as contact surfaces with no protruding rib, and gently sloping portions are provided between the protruding ribs and the contact surfaces to gradually protrude from the surface of the corrugated fin with increasing distance from the contact surfaces of the crest and trough portions, and are continuous with the protruding ribs.

According to this configuration, the corrugated fin is disposed in a channel defined between the tube plates in the plate fin heat exchanger. The intermediate portion of the corrugated fin connecting the crest and trough portions together divides the interior of the channel into a plurality of subchannels. A fluid flows through the subchannels in the first direction.

The intermediate portion of the corrugated fin has the plurality of protruding ribs extending between the crest and trough portions and arranged in the first direction, i.e., in the direction of flow of the fluid. The protruding ribs accelerate a turbulent flow of the fluid flowing along the surface of the corrugated fin, and improve the efficiency of the plate fin heat exchanger. As a result of cooling the fluid in the channel of the plate fin heat exchanger, if the fluid condenses, the protruding ribs of the intermediate portion of the corrugated fin improve the wettability of the fin surface, and accelerate the discharge of droplets. Furthermore, the ribs protruding beyond the fin surface contributes to an improvement in the strength of the corrugated fin itself.

In the plate fin heat exchanger having the configuration described above, surfaces of the crest and trough portions of the corrugated fin being in contact with the tube plates are configured as the contact surfaces with no protruding rib. Since the contact surfaces are even, the area of contact between the corrugated fin and the tube plates increases, thus increasing the adhesion therebetween. This increases the bonding strength between the corrugated fin and the tube plates. This helps improve the strength of the plate fin heat exchanger. The surface of the crest portion is an outer surface of an associated portion of the corrugated fin, and the surface of the trough portion is also an outer surface of an associated portion of the corrugated fin. Thus, the surface of the trough portion corresponds to a surface of an associated portion of the corrugated fin facing away from the surface of the crest portion.

The corrugated fin has the gently sloping portions between the contact surfaces of the crest and trough portions and the protruding ribs. The gently sloping portions gradually protrude from the fin surface with increasing distance from the contact surfaces, and are continuous with the protruding ribs. The gently sloping portions each function as part of an associated one of the protruding ribs, and contribute to the acceleration of a turbulent flow of the fluid described above, and other advantages. Thus, the gently sloping portions allow the crest and trough portions of the corrugated fin to have a contact surface, and allow the protruding ribs to be formed over as large a region as possible. This may increase the bonding strength between the corrugated fin and the tube plates, and may maximize various advantages provided by the protruding ribs.

The crest and trough portions of the corrugated fin may be curved, and the gently sloping portions may be each arranged to extend along an associated one of the curved crest and trough portions.

Specifically, the gently sloping portions of the corrugated fin having the curved crest and trough portions and thus having a substantially sinusoidal cross section advantageously extend along the curved crest and trough portions. This may ensure even contact portions, and may allow the protruding ribs to be provided over as large a region as possible.

The corrugated fin and the tube plates may be bonded together by brazing, and fillets that are made of a brazing filler metal gathering during brazing may be provided between the gently sloping portions and the tube plates.

The surface of the corrugated fin at the junctions between the corrugated fin and the tube plates is gradually further away from the tube plates in the direction from the crest or trough portion to the intermediate portion as viewed in cross section. When the corrugated fin and the tube plates have been brazed together, the brazing filler metal gathers at the junctions between the corrugated fin and the tube plates due to the surface tension to form wedge-shaped fillets.

The plate fin heat exchanger having the configuration includes the corrugated fin having the protruding ribs and the gently sloping portions. Among these portions, the gently sloping portions are positioned in the vicinity of the junctions between the corrugated fin and the tube plates. Since the gently sloping portions protrude from the surface of the corrugated fin, the distance between the tube plates and the associated gently sloping portions is shorter than the distance between the tube plates and the surface of the corrugated fin in the vicinity of the junctions. In other words, the distance from a point of each gently sloping portion to the surface of the associated tube plate is kept relatively short even if the point is away from the contact surface of the crest or trough portion. Thus, the brazing filler metal gathers, due to the surface tension, at the junctions between the gently sloping portions and the tube plates as well as at the above-described junctions between the surface of the corrugated fin and the tube plates to form the fillets. The size of these fillets is larger than that of the fillets that do not adjoin the gently sloping portions. Thus, a plurality of large fillets are formed to correspond to the protruding ribs and the gently sloping portions of the corrugated fin both arranged in the first direction, thereby improving the brazing strength between the corrugated fin and the tube plates. This helps improve the strength of the plate fin heat exchanger in combination with the fact that as described above, the crest and trough portions having the even contact surface and the corrugated fin having the protruding ribs improve the strength of the corrugated fin itself.

The corrugated fin may be creased to provide a plurality of grooved projections and recesses, and the projections or recesses provided by the creasing may constitute the protruding ribs and the gently sloping portions.

Creasing the corrugated fin allows the plurality of protruding ribs, which extend between the crest and trough portions, to be easily formed on the intermediate portion of the corrugated fin and to be arranged in the first direction.

The grooved projections and recesses provided by the creasing may extend on the corrugated fin in the second direction, and the protruding ribs of the corrugated fin may be orthogonal to the crest line of the crest portion and the trough line of the trough portion.

The protruding ribs of the intermediate portion of the corrugated fin that are orthogonal to the crest line of the crest portion and the trough line of the trough portion are particularly effective at improving the strength of the corrugated fin itself.

The present disclosure also relates to a method for making a corrugated fin for a heat exchanger. This making method includes: creasing a thin plate member to form grooved projections and recesses both extending in a predetermined direction, the grooved projections and recesses being alternated; and processing the creased thin plate member into the corrugated fin having a crest portion having a crest line extending in a first direction, and a trough portion having a trough line extending in the first direction, the crest and trough portions being alternately arranged in a second direction orthogonal to the first direction.

While the thin plate member is processed into the corrugated fin, the projections and recesses on surfaces of the crest and trough portions are evened to prevent the crest and trough portions from having a surface that has the projections and recesses.

According to this configuration, the thin plate member is creased to form a plurality of grooved projections and recesses, and is then processed into a corrugated fin. Thus, the grooved projections and recesses constitute the protruding ribs described above.

When the thin plate member is processed into the corrugated fin, the projections and recesses previously formed on the thin plate member are evened by causing portions of the thin plate member corresponding to the crest and trough portions to elongate and pressing the crest and trough portions in the plate thickness direction with corresponding forming dies. This allows the crest and trough portions of the corrugated fin to have an even surface. Forming the even surfaces allows the gently sloping portions continuous with the protruding ribs to be formed in the vicinity of these surfaces.

In other words, the making method is suitable for making a corrugated fin having crest and trough portions both with a contact surface, and an intermediate portion having a plurality of protruding ribs and a plurality of gently sloping portions between the contact surfaces and the associated protruding ribs.

Advantages of the Invention

As can be seen from the foregoing description, the plate fin heat exchanger includes a corrugated fin having an intermediate portion with a plurality of protruding ribs. On the other hand, the corrugated fin has crest and trough portions each having an even contact surface and being in contact with an associated one of tube plates, and gently sloping portions are also provided continuously with the protruding ribs in the vicinity of the contact surface. This may maximize the function of the protruding ribs, and may increase the area of contact between the corrugated fin and the tube plates to improve the bonding strength therebetween.

According to the method for making a corrugated fin for a heat exchanger, a corrugated fin may be easily made which has the protruding ribs and the gently sloping portions described above, and further has crest and trough portions each having an even contact surface.

DESCRIPTION OF EMBODIMENTS

An embodiment of a heat exchanger will now be described with reference to the drawings. Note that, in the attached drawings, the shapes of components are partially drawn exaggeratedly for ease of understanding, and their details may be different from the actual shapes.

Figure 1:
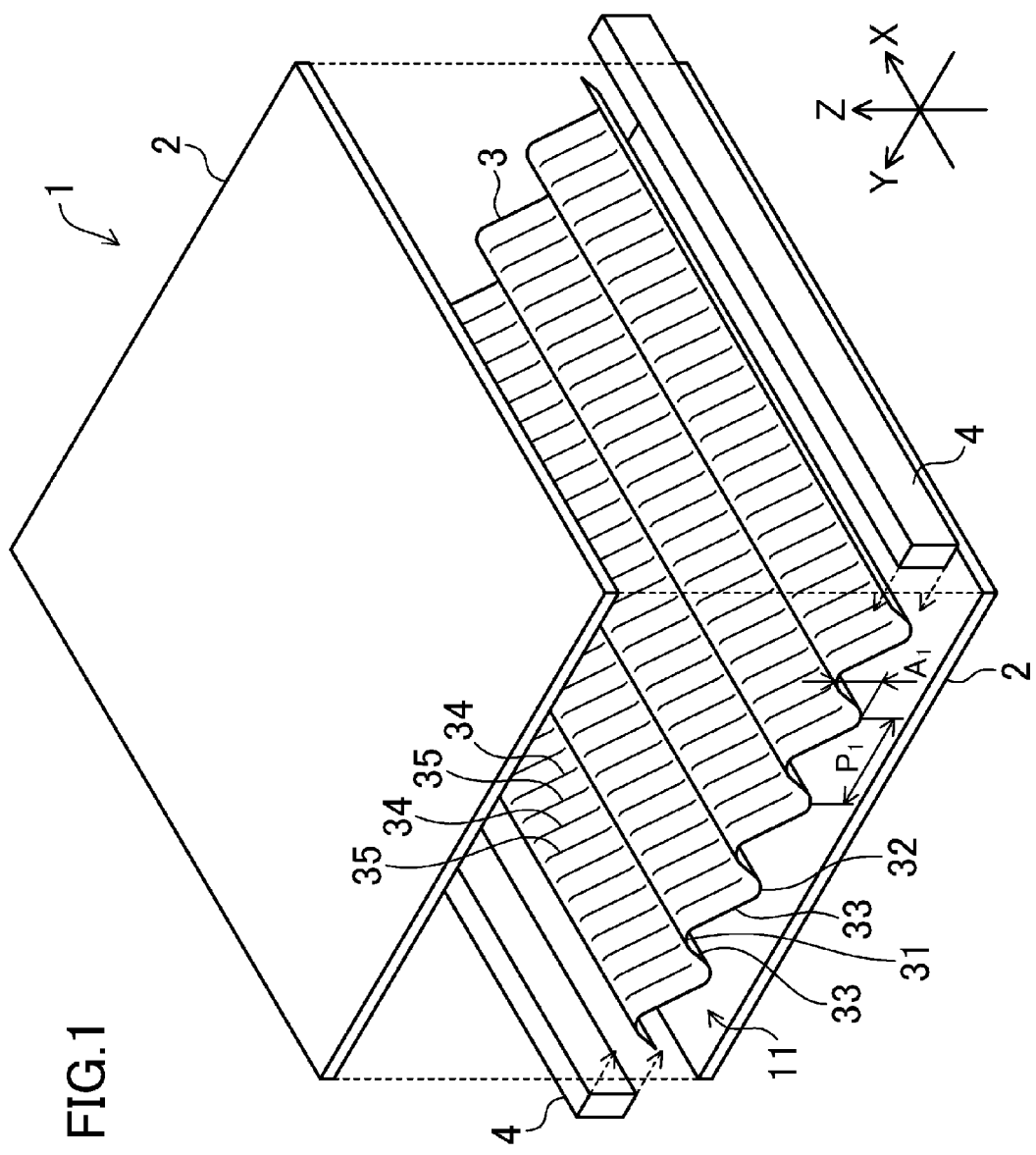
FIG. 1 is an exploded perspective view conceptually illustrating a portion of a plate fin heat exchanger.

FIG. 1 is an exploded perspective view conceptually illustrating a configuration for a plate fin heat exchanger 1. The plate fin heat exchanger 1 does not substantially have up/down and right/left orientations. However, for the sake of explanation, the direction from the near left to the far right on the paper on which FIG. 1 is drawn will be referred to as an X direction, the direction from the near right to the far left on the paper will be referred to as a Y direction, and the upward/downward direction will be referred to as a Z direction. The X, Y, and Z directions are orthogonal to one another. The plate fin heat exchanger (more precisely, a heat exchanger core) 1 shown in FIG. 1 includes a plurality of tube plates 2 and a plurality of corrugated fins 3. The tube plates 2 and the corrugated fins 3 are alternately stacked in the Z direction, and are integral with each other by being brazed together. For ease of understanding, FIG. 1 illustrates only one of the corrugated fins 3 and two of the tube plates 2, 2 between which this one of the corrugated fins 3 is interposed. The two tube plates 2, 2, and two side bars 4, 4 disposed on respective end portions of the tube plates 2 in the Y direction define a first channel 11 through which a target fluid (i.e., a first fluid) for this plate fin heat exchanger 1 flows. Although not shown in FIG. 1, a second channel through which a second fluid exchanging heat with the first fluid flows is adjacent to the first channel 11 with one of the tube plates 2, 2 interposed therebetween. In other words, the first channel 11 and the second channel are adjacent to each other in the Z direction.

The plate fin heat exchanger 1 has various applications. This plate fin heat exchanger 1 may be used, for example, to exchange heat between the first and second fluids and cool the first or second fluid. Conversely, the plate fin heat exchanger 1 may also be used to heat the first or second fluid. In some cases, a fluid flowing through a channel of the plate fin heat exchanger 1 is cooled to condense (liquefy), depending on the application of the plate fin heat exchanger 1. In some cases, a fluid flowing through a channel of the plate fin heat exchanger 1 is heated to evaporate (vaporize).

Each tube plate 2 is a flat plate member with a predetermined thickness. The tube plate 2 may be set to have an appropriate thickness. The tube plate 2 is made of a material with high thermal conductivity, such as metal. The tube plate 2 is specifically made of aluminum, an aluminum alloy, or stainless steel. However, the materials described herein are merely examples of the present disclosure. The tube plate 2 is interposed between the first channel 11 and the second channel that is not shown in FIG. 1, and defines part of the first channel 11 and part of the second channel. The tube plate 2 constitutes a primary heat transfer surface that transfers heat between the first fluid flowing through the first channel 11 and the second fluid flowing through the second channel.

Each corrugated fin 3 is a corrugated plate member with a predetermined thickness. The corrugated fin 3 is also made of a material with high thermal conductivity, such as metal. The corrugated fin 3 is specifically made of aluminum, an aluminum alloy, or stainless steel. However, the materials described herein are merely examples of the present disclosure. The corrugated fin 3 is disposed in one of the first and second channels while being bonded to associated ones of the tube plates 2. The corrugated fin 3 sections the inside of the one of the first and second channels into a plurality of subchannels in the Y direction, and constitutes a secondary heat transfer surface.

Figure 2:
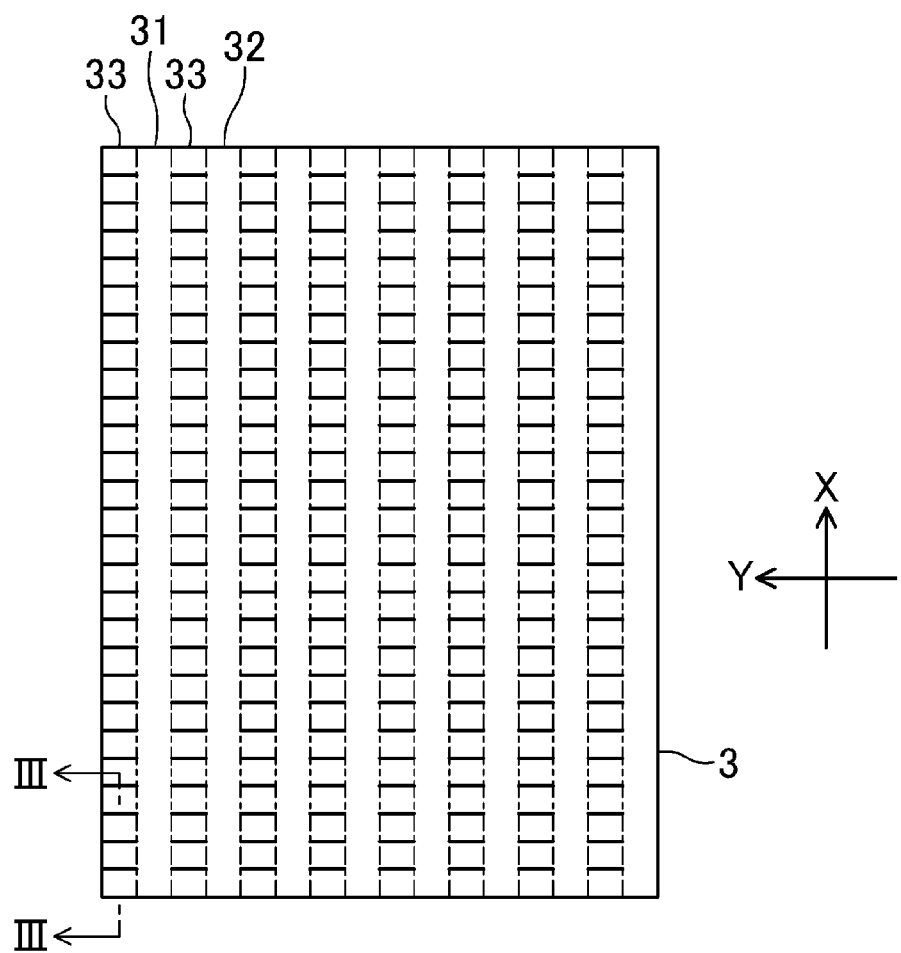
FIG. 2 is a plan view conceptually illustrating a corrugated fin for use in the plate fin heat exchanger.

In the examples shown in FIGS. 1 and 2, the corrugated fin 3 has crest portions (i.e., tops) 31 each having a crest line extending in the X direction, and trough portions (i.e., bottoms) 32 each having a trough line extending in the same X direction. The crest portions 31 and the trough portions 32 are alternately arranged in the Y direction. The corrugated fin 3 shown in FIGS. 1 and 2 has the crest portions 31 that are curved generally in the form of a segment of a circle. Just like the crest portions 31, the trough portions 32 are also curved generally in the form of a segment of a circle. An intermediate portion 33 of the corrugated fin 3 between each crest portion 31 and an adjacent one of the trough portions 32 is in the form of a straight line inclined relative to the Z direction in this example (see also FIG. 5A). Thus, the cross section of the corrugated fin 3 shown here has a generally sinusoidal shape as a whole. However, the sinusoidal shape of the corrugated fin 3 is merely an example of the present disclosure. The angle of inclination of the intermediate portion 33, for example, may be appropriately set. The intermediate portion 33 may be designed to extend in the Z direction, i.e., so as not to be inclined relative to the Z direction. The height $A_1$ from each trough portion 32 to an adjacent one of the crest portions 31 of the corrugated fin 3 in the Z direction (that is, the wave amplitude×2) and the distance $P_1$ between adjacent ones of the crest portions 31 of the corrugated fin 3 in the Y direction (that is, the wave pitch) may be appropriately set. The height of each channel in which the corrugated fin 3 is disposed determines the height $A_1$ of the waves of the corrugated fin 3. The pitch $P_1$ between each adjacent pair of the waves of the corrugated fin 3 is determined with various factors, such as the heat transfer performance of the plate fin heat exchanger 1 and a pressure drop in the channel, taken into account.

Figure 3A:
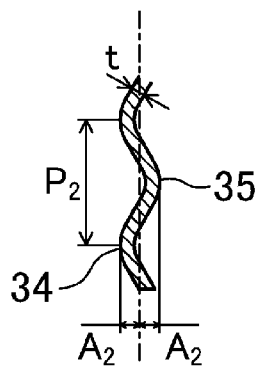
FIG. 3A is an end view taken along the plane shown in FIG. 2.
Figure 3B:
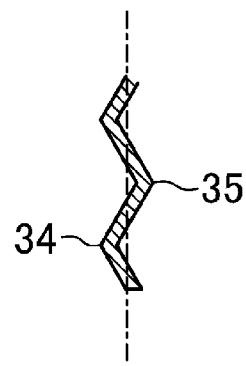
FIG. 3B shows a variation of the corrugated fin.

The surface of this corrugated fin 3 has protruding ribs 34 that protrude from this surface, and recessed ribs 35 that are recessed from this surface. The cross-sectional shape of each of the protruding ribs 34 and the recessed ribs 35 is curved in the form of, for example, a segment of a circle as shown in FIG. 3A. The protruding ribs 34 and the recessed ribs 35 are alternately arranged in the X direction. The corrugated fin 3 disposed in the plate fin heat exchanger 1 does not have up/down and right/left orientations. Thus, the protruding ribs 34 protruding from the surface may be recessed ribs recessed therefrom as viewed from the opposite side. Portions of the corrugated fin protruding from the reference indicated by the dash dot line in FIG. 3A in one direction are herein referred to as the protruding ribs 34, and portions thereof protruding from the reference in the opposite direction are herein referred to as the recessed ribs 35. The curved shape of each of the protruding ribs 34 and the recessed ribs 35 should not be limited to the shape shown in FIG. 3A. The curvature of the curved shape of each of the protruding ribs 34 and the recessed ribs 35 may be appropriately set. The protruding ribs 34 and the recessed ribs 35 do not have to be curved, and may be generally angular as shown in FIG. 3B.

The distance $A_2$ from the reference to the distal end of each protruding rib 34 and the distance $A_2$ from the reference to the bottom end of each recessed rib 35 (i.e., the amplitude of the waves) may be appropriately set. The distance $A_2$ may be set to be within the range of, for example, about 65-135% of the plate thickness t of the corrugated fin 3 (i.e., $0.65 \leq A_2/t \leq 1.35$), but should not be limited to this range.

In FIGS. 1 and 2, the protruding ribs 34 each have the most protruding rib indicated by the solid line, and the recessed ribs 35 each have the deepest portion indicated by the solid line. The protruding ribs 34 and the recessed ribs 35 are formed on the intermediate portions 33 of the corrugated fin 3, and are not formed on the crest portions 31 and the trough portions 32. As shown in FIG. 2, the protruding ribs 34 and the recessed ribs 35 extend in the Y direction when the corrugated fin 3 is viewed in plan (i.e., viewed in the Z direction). In other words, the protruding ribs 34 and the recessed ribs 35 are orthogonal to the crest lines of the crest portions 31 and the trough lines of the trough portions 32 both extending in the X direction. The protruding ribs 34 and the recessed ribs 35 are alternately arranged in the X direction along the crest lines of the crest portions 31 and the trough lines of the trough portions 32. The pitch $P_2$ between each adjacent pair of the protruding ribs 34 or between each adjacent pair of the recessed ribs 35 may be appropriately set.

Note that the corrugated fin 3 having such a shape is disposed at least in the first channel 11. A corrugated fin disposed in the second channel of the plate fin heat exchanger 1 may have the same shape as the corrugated fin 3 or a different shape from the corrugated fin 3.

Figure 4:
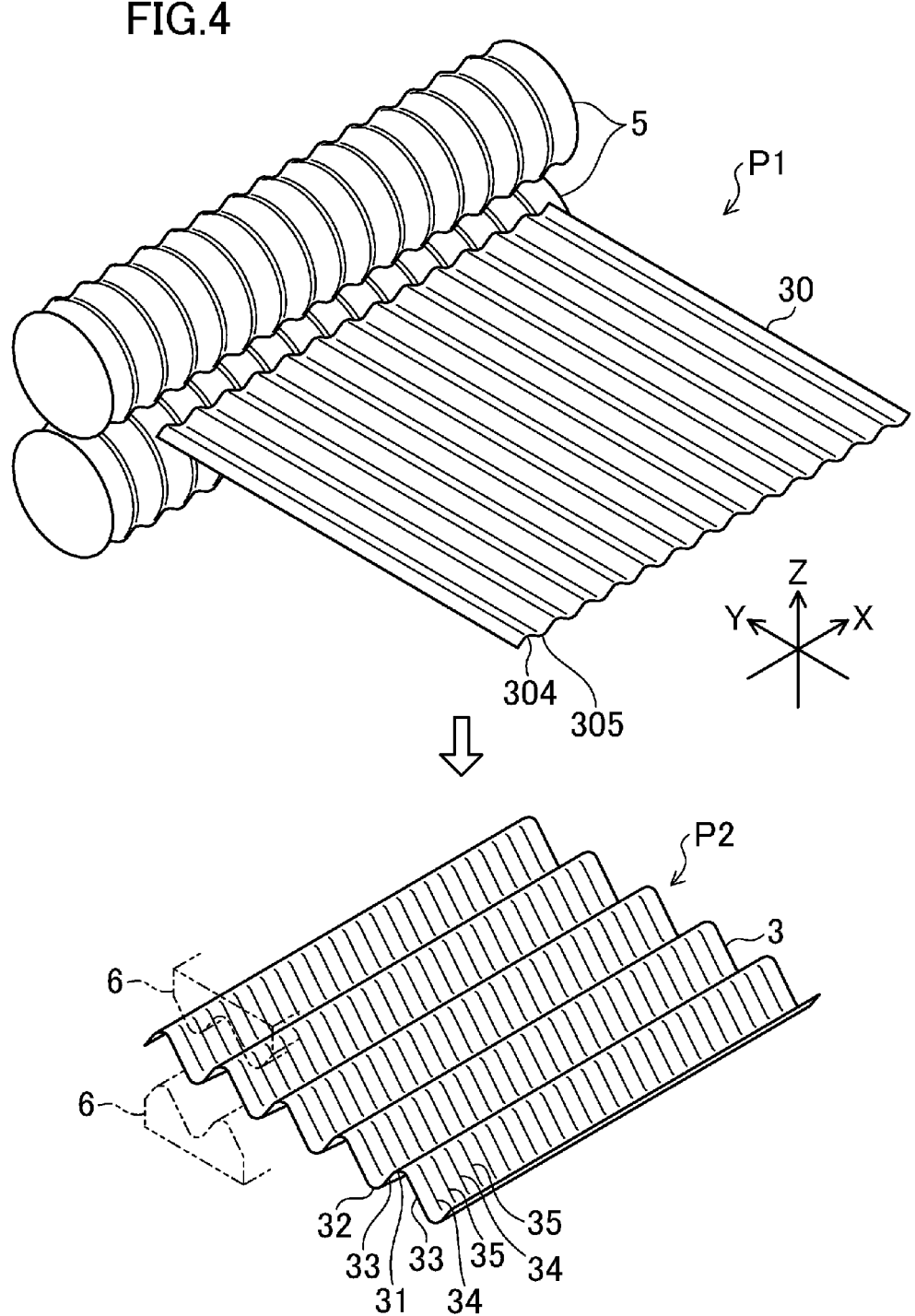
FIG. 4 illustrates a process flow of making a corrugated fin for use in a plate fin heat exchanger.

The corrugated fin 3 having the intermediate portions 33 each having the protruding ribs 34 and the recessed ribs 35 may be made using the following procedure. Specifically, as shown in FIG. 4, a thin plate member 30 that is a material of the corrugated fin 3 is prepared, and is creased to form grooved projections and recesses (see process step P1). This creasing process may be performed using a pair of forming rollers 5, 5 meshing with each other. Specifically, each forming roller 5 has large-diameter portions and small-diameter portions, and is designed to have a corrugated roller surface. The thin plate member 30 is passed between the pair of the forming rollers 5, 5, thereby forming many grooved projections and recesses on the member 30. Grooves 305 and ridges 304 thus formed extend in the Y direction, and form stripes arranged in the X direction. These ridges 304 and these grooves 305 constitute the protruding ribs 34 and the recessed ribs 35 of the corrugated fin 3. The creasing process in which projections and recesses are formed on the thin plate member 30 does not have to be performed using a pair of rollers, and may be performed using any other known technique. The process performed using the pair of rollers advantageously allows a band-like long member to be continuously creased.

The thin plate member 30 thus creased is processed into a corrugated fin 3. An appropriate one of various known techniques may be used as a technique for processing the thin plate member into the corrugated fin 3. For example, a pair of upper and lower forming teeth (that is, molding dies) 6, 6 between which the thin plate member 30 is sandwiched, as indicated by the phantom lines shown in a lower part of FIG. 4, may be used, but are merely an example of the present disclosure. Specifically, while the thin plate member 30 is moved in the Y direction, the pair of the upper and lower forming teeth 6, 6 may be alternately actuated to sequentially form crest portions 31 and trough portions 32 of the corrugated fin 3 (see process step P2).

Suppose, in this case, the crest and trough portions 31 and 32 of the corrugated fin 3 are formed such that the crest lines and the trough lines extend in a direction orthogonal to the projections and recesses formed on the thin plate member 30 by the creasing process. In that case, the crest lines and the trough lines of the corrugated fin 3 may be made orthogonal to the protruding ribs 34 and the recessed ribs 35 formed on the intermediate portions 33.

In this forming, portions of the previously formed ridges 304 and grooves 305 of the thin plate member 30 corresponding to the crest and trough portions 31 and 32 of the corrugated fin 3 are evened. Specifically, in this forming, the extension of a material at the crest and trough portions 31 and 32 and the application of pressures to the crest and trough portions 31 and 32 in the plate thickness direction with the forming teeth 6, 6 both allow the projections and recesses on the crest and trough portions 31 and 32 to be evened. This prevents the crest and trough portions 31 and 32 of the finished corrugated fin 3 from having the protruding ribs 34 and the recessed ribs 35. Thus, the crest and trough portions 31 and 32 may have a flat even surface. The flat surfaces of the crest and trough portions 31 and 32 will be respective contact surfaces 310, 320 each being in contact with the associated tube plate 2 as illustrated in FIGS. 5A and 5D.

Figure 5A:
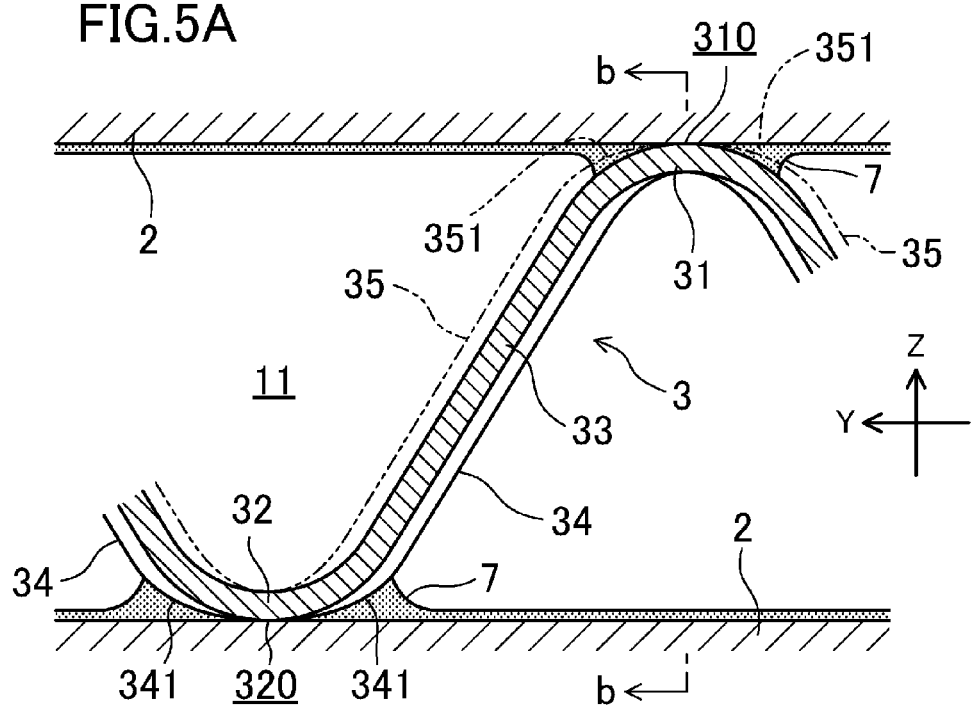
FIG. 5A is an end view illustrating a predetermined cross section of a plate fin heat exchanger.
Figure 5B:
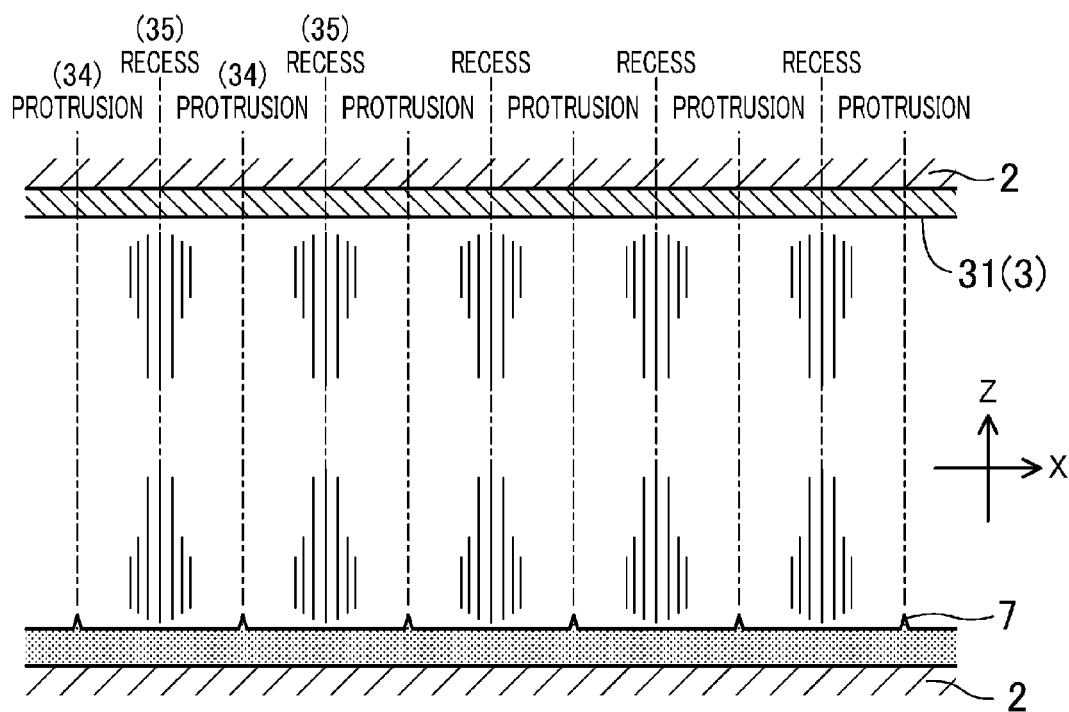
FIG. 5B is a cross-sectional view taken along the plane b-b shown in FIG. 5A.
Figure 5C:
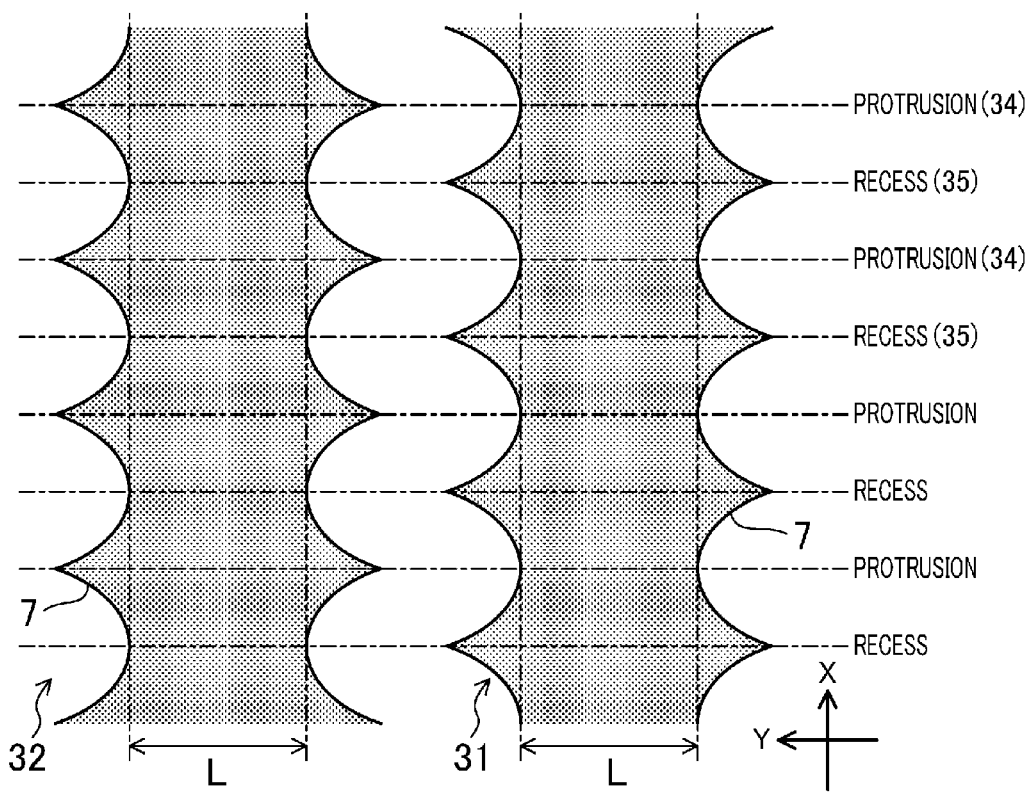
FIG. 5C illustrates the shape of a fillet in a portion of the plate fin heat exchanger where a corrugated fin and a tube plate are brazed together.
Figure 5D:
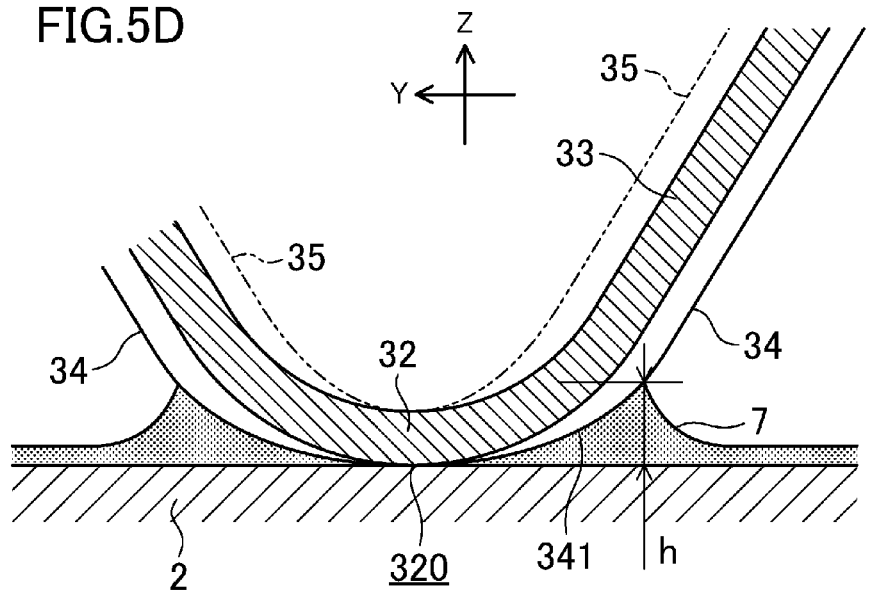
FIG. 5D is an enlarged cross-sectional view illustrating the portion where the corrugated fin and the tube plate are brazed together.

As illustrated in FIGS. 5A and 5D, evening the projections and the recesses on the crest and trough portions 31 and 32 causes gently sloping portions 341, 351 to be formed continuously with the protruding ribs 34 and the recessed ribs 35 and in the vicinity of the respective contact surfaces 310, 320. The gently sloping portions 341, 351 gradually protrude from the fin surface with increasing distance from the respective contact surfaces 310, 320.

In the example shown in FIG. 5A here, the protruding ribs 34 protrude from the lower surface of the corrugated fin 3, and the gently sloping portions 341 that are continuous with the protruding ribs 34 are disposed on both sides of each trough portion 32 shown in FIG. 5A in the Y direction. The height of each gently sloping portion 341 from the fin surface gradually increases with increasing distance from the contact surface 320 of the associated trough portion 32. The gently sloping portion 341 is provided to approach the surface of the lower tube plate 2. On the other hand, the protruding ribs 34 face away from the contact surfaces 310 of the crest portions 31 shown in FIG. 5A. In this case, the gently sloping portion of each protruding rib 34 is not provided in the vicinity of the associated crest portion 31. As described above, evening the projections and the recesses on the crest portions 31 allows regions of the corrugated fin having the protruding ribs 34 and located in the vicinity of the contact surfaces 310 of the crest portions 31 (i.e., the upper surface of the corrugated fin 3 shown in FIG. 5A) to have no unevenness.

As indicated by the phantom line shown in FIG. 5A, the recessed ribs 35 adjacent to the associated protruding ribs 34 in the X direction protrude from the upper surface of the corrugated fin 3. Thus, gently sloping portions 351 that are continuous with the recessed ribs 35 are provided in the vicinity of each crest portion 31 and on both sides of each crest portion 31 in the Y direction. The height of each gently sloping portion 351 from the fin surface gradually increases with increasing distance from the contact surface 310 of the associated crest portion 31. The gently sloping portion 351 is provided to approach the surface of the upper tube plate 2. The recessed ribs 35 face away from the contact surfaces 320 of the trough portions 32. In this case, the gently sloping portion of each recessed rib 35 is not provided in the vicinity of the associated trough portion 32. As described above, evening the projections and the recesses on the trough portions 32 allows regions of the corrugated fin having the recessed ribs 35 and located in the vicinity of the contact surfaces 320 of the trough portions 32 (i.e., the lower surface of the corrugated fin 3 shown in FIG. 5A) to have no unevenness.

Such gently sloping portions 341 and 351 are respectively provided in the vicinity of the trough and crest portions 32 and 31 curved generally in the form of a segment of a circle, and extend along their curved shape. As a result, the distance h between each gently sloping portion 341 and the tube plate 2 is shorter than that between a portion of the fin with no gently sloping portion (i.e., a portion thereof shifted from each gently sloping portion in the X direction) and the tube plate 2 as illustrated in the enlarged view in FIG. 5D. In FIG. 5D, the portion of the fin with no gently sloping portion is shown as the fin surface. Each gently sloping portion 341 protrudes beyond the fin surface, and the distance h between the gently sloping portion 341 and the tube plate 2 decreases by the amount of this protrusion. In other words, comparison between the position, in the Y direction, of a point of the fin surface from which the distance to the tube plate 2 is equal to the distance h and the position, in the Y direction, of a point of the gently sloping portion 341 from which the distance to the tube plate 2 is also equal to the distance h shows that the position of the point of the gently sloping portion 341 in the Y direction is further from the contact surface 320. The same statement also applies to the gently sloping portion 351 of the recessed rib 35 although not shown.

As described above, the plate fin heat exchanger 1 is formed by brazing the tube plates 2 and the corrugated fins 3 together. Specifically, the tube plates 2 and the corrugated fins 3 are alternately stacked with a brazing filler metal provided on the surfaces of the tube plates 2, thereby assembling the plate fin heat exchanger. The plate fin heat exchanger thus assembled is, for example, decompressed and heated in a vacuum furnace, and is thus integrated. During this brazing, the brazing filler metal gathers at the junctions between the corrugated fins 3 and the tube plates 2 due to the surface tension. Thus, wedge-shaped fillets 7 are formed.

Here, as illustrated in FIG. 5D, portions of the fin corresponding to the gently sloping portions 341 (and 351) are maintained such that even if they are further away from the contact surfaces 320, the distance from these portions of the fin to the tube plate 2 is shorter by the amount of protrusion of the gently sloping portions 341. For this reason, a portion of each fillet 7 formed between the associated gently sloping portion 341 and the tube plate 2 is larger than the other portion of the fillet 7 formed on a portion of the fin with no gently sloping portion 341 as illustrated in FIGS. 5B and 5C. FIG. 5B is a cross-sectional view taken along the plane b-b shown in FIG. 5A, and FIG. 5C illustrates the shape of the fillet at the crest and trough portions 31 and 32 shown in FIG. 5A. The dash dot lines shown in FIGS. 5B and 5C indicate the portions of the fin having the protruding ribs 34 and the recessed ribs 35, and these portions having the protruding ribs 34 and the recessed ribs 35 include the gently sloping portions 341, 351. However, as described with reference to FIG. 5A, the gently sloping portions 341 continuous with the protruding ribs 34 are not provided in the vicinity of the crest portions 31, and the gently sloping portions 351 continuous with the recessed ribs 35 are not provided in the vicinity of the trough portions 32, either.

In the trough portion 32 shown on the left part of FIG. 5C, the portions of the fin having the protruding ribs 34 are each provided with the gently sloping portion 341. Thus, the brazing filler metal gathers on both sides of the trough portion 32 in the Y direction to form large fillets. As a result, the length, in the Y direction, of portions of each fillet 7 adjoining the protruding ribs is relatively long, and the length, in the Y direction, of the other portions of the fillet 7 is relatively short. More properly speaking, the length, in the Y direction, of portions of the fillet adjoining the protruding ribs 34 is longest, and the length, in the Y direction, of the fillet adjoining the recessed ribs 35 is shortest. The fillet length varies between the protruding ribs 34 and the recessed ribs 35.

In the crest portion 31 shown on the right part of FIG. 5C, the portions of the fin having the protruding ribs 34 are not provided with any gently sloping portion. Thus, the length, in the Y direction, of portions of each fillet adjoining these portions is shortest. In the crest portion 31, the portions of the fin having the recessed ribs 35 (the portions indicated by the phantom lines shown in FIG. 5A) are each provided with the gently sloping portion 351. Thus, the brazing filler metal gathers on both sides of the crest portion 31 in the Y direction, and the length, in the Y direction, of portions of the fillet adjoining these portions of the fin is longest. Thus, the fillet length varies between the protruding ribs 34 and the recessed ribs 35. As illustrated in FIG. 5C, the phase of change of the length of a fillet adjoining the crest portion 31 is shifted from the phase of change of the length of a fillet adjoining the trough portion 32.

Here, portions of the fin where in FIG. 5C, the length of the fillet 7 in the Y direction is shortest are portions of the fin that are not provided with the gently sloping portions 341, 351 of the protruding ribs 34 and the recessed ribs 35 as described above. These portions have the same shape as a corrugated fin having a conventional shape with no protruding rib 34 and with no recessed rib 35. Thus, this corrugated fin 3 has at least substantially the same fillet length L as a conventional corrugated fin, and the gently sloping portions 341 and 351 respectively continuous with the protruding ribs 34 and the recessed ribs 35 are provided, thereby allowing the corrugated fin to have a longer fillet length than the conventional corrugated fin does. This allows the strength of brazing between the corrugated fin 3 and the tube plate 2 to be higher than that in the related art.

The protruding ribs 34 and the recessed ribs 35 formed on the intermediate portions 33 of the corrugated fin 3 and extending in the Y direction improve the strength of the corrugated fin 3 itself.

Unlike the intermediate portions 33 each having the protruding ribs 34 and the recessed ribs 35 thus formed, the crest and trough portions 31 and 32 of the corrugated fin 3 each have the contact surface 310, 320 with no protruding rib 34 and with no recessed rib 35. The contact surface 310, 320 is even, resulting in a larger area of contact between the corrugated fin 3 and the tube plate 2.

Thus, the contact surface 310, 320 increases the area of contact between the corrugated fin 3 and the tube plate 2, and the gently sloping portions 341, 351 increase the size of the fillets 7. This improves the bonding strength between the corrugated fin 3 and the tube plate 2, and the protruding ribs 34 and the recessed ribs 35 increase the strength of the corrugated fin 3 itself. As a result, the strength of the plate fin heat exchanger 1 significantly increases.

Furthermore, the protruding ribs 34 and the recessed ribs 35 are arranged in the direction of flow of a fluid in each of the subchannels defined by the intermediate portions 33 of the corrugated fin 3. This accelerates a turbulent flow of the fluid flowing along the fin surface, and contributes to an improvement in the efficiency of the plate fin heat exchanger 1. In this plate fin heat exchanger 1, when the fluid condenses, the protruding ribs 34 and the recessed ribs 35 protruding beyond the fin surface improve the wettability of the surface of the corrugated fin 3, and allow condensed liquid to be quickly discharged to outside the plate fin heat exchanger 1.

The gently sloping portions 341, 351 may have a fluid-flow-related function and other functions similar to those of the protruding ribs 34 and the recessed ribs 35 in addition to the function of gathering the brazing filler metal described above. Thus, the provision of the gently sloping portions 341, 351 allows the protruding ribs 34 and the recessed ribs 35 to be formed over as large a region as possible.

The present disclosure does not always have to be applied to the plate fin heat exchanger 1 having the configuration shown in FIGS. 1-5D, but may be applied to plate fin heat exchangers having other different configurations.

Figure 6:
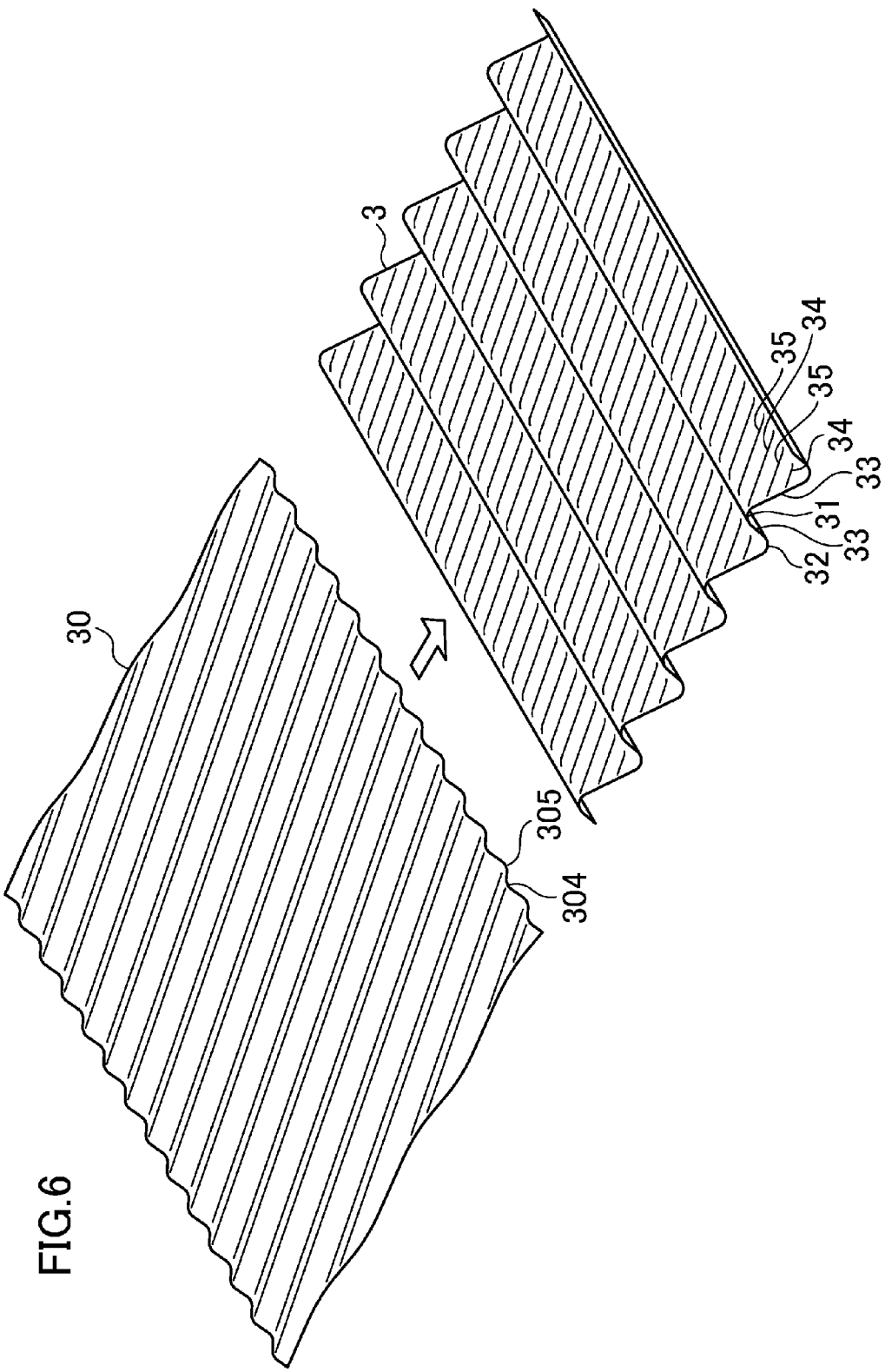
FIG. 6 is a perspective view illustrating a corrugated fin having a different shape from the corrugated fin shown in FIG. 2.

FIG. 6 illustrates a variation of the protruding ribs 34 and the recessed ribs 35 of the corrugated fin 3. Specifically, in the corrugated fin 3 shown in FIGS. 1-5D, the protruding ribs 34 and the recessed ribs 35 are provided to be orthogonal to the crest lines of the crest portions 31 and the trough lines of the trough portions 32. On the other hand, in the variation shown in FIG. 6, the protruding ribs 34 and the recessed ribs 35 are provided to intersect with the crest lines of the crest portions 31 and the trough lines of the trough portions 32 at a predetermined angle (except 90°). In other words, the protruding ribs 34 and the recessed ribs 35 are inclined relative to the Y direction. Note that the angle of inclination of the protruding ribs 34 and the recessed ribs 35 may be appropriately set.

To obtain the corrugated fin 3 having such a configuration, the thin plate member 30 is first creased to form obliquely inclined grooved projections and recesses as illustrated in the left part of FIG. 6. In this state, the member 30 is processed into the corrugated fin as illustrated in the right part of FIG. 6. An appropriate one of various known techniques may be used as the creasing process and a process for processing the thin plate member into the corrugated fin. Also in this variation, evening the projections and the recesses formed by creasing during the process for processing the thin plate member into the fin allows the crest and trough portions 31 and 32 to have a flat contact surface. This allows the gently sloping portions to be formed between the contact surface and the protruding ribs 34 and the recessed ribs 35. Thus, a plate fin heat exchanger including the corrugated fin 3 of this variation also provides the same advantages as the plate fin heat exchanger 1 described above.

The corrugated fin 3 having the protruding ribs 34 and the recessed ribs 35 does not always have to have a sinusoidal cross section shown in FIGS. 1-5D. Such a corrugated fin 3 having a rectangular wave-shaped cross section as shown in, for example, FIG. 7 may have protruding ribs 34 and recessed ribs 35.

Figure 7:
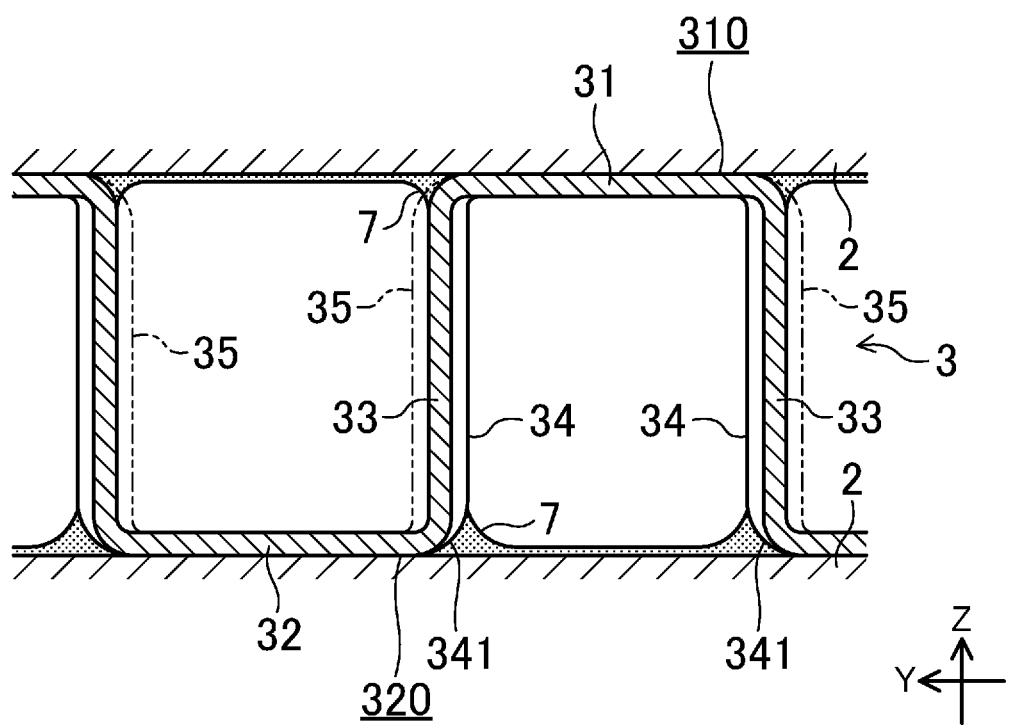
FIG. 7 is an end view illustrating a portion of a plate fin heat exchanger including a corrugated fin formed in the form of rectangular waves.

Such a rectangular wave-shaped corrugated fin 3 as shown in FIG. 7 has crest and trough portions 31 and 32 that are both substantially flat, and intermediate portions 33 connecting the crest and trough portion 31 and 32 together and extending in the Z direction. The intermediate portions 33 may be inclined relative to the Z direction at any angle.

This rectangular wave-shaped corrugated fin 3 may also be made by creasing a thin plate member to form grooved projections and recesses and then processing the thin plate member into a corrugated fin. Evening the projections and the recesses on the crest and trough portions 31 and 32 during the process for processing the thin plate member into the fin enables the formation of protruding ribs 34 and gently sloping portions 341 (and recessed ribs and gently sloping portions continuous with the recessed ribs although not shown in FIG. 7).

Portions of the rectangular wave-shaped corrugated fin 3 between the crest portions 31 and the associated intermediate portions 33 and between the trough portions 32 and the associated intermediate portions 33 are rounded. The gently sloping portions 341 (and the gently sloping portions continuous with the recessed ribs) are provided on these rounded portions. Also in the rectangular wave-shaped corrugated fin 3, the distance between the gently sloping portions 341 and the associated tube plate 2 is relatively short. This allows a fillet formed of a brazing filler metal gathering due to the surface tension to be relatively large. Thus, a plate fin heat exchanger including the rectangular wave-shaped corrugated fin 3 also provides the same advantages as the plate fin heat exchanger 1 described above.

The rectangular wave-shaped corrugated fin 3 shown in FIG. 7 may have the protruding ribs 34 and the recessed rib 35 both extending in the Y direction as shown in FIG. 1 or both inclined relative to the Y direction as shown in FIG. 6.

The corrugated fins 3 having the configurations described above have both the protruding ribs 34 and the recessed ribs 35. As described above with reference to FIGS. 3A and 3B, these protruding ribs 34 are portions of the fin protruding from the reference indicated by the dash dot line in one direction, and these recessed ribs 35 are portions thereof protruding from this reference in the opposite direction. In contrast to this, the corrugated fin may have only either protruding ribs or recessed ribs. In other words, the corrugated fin has only portions protruding from the reference in any one of the directions. The corrugated fin having such a configuration may also increase the strength of the corrugated fin itself, and the contact surfaces of the crest and trough portions may increase the bonding strength between the corrugated fin and the tube plates 2.

The corrugated fin having only either the protruding ribs or the recessed ribs has gently sloping portions adjoining only either the crest portions 31 or the trough portions 32 shown in FIG. 5C. As a result, the large fillets 7 described above are also formed on only either the crest portions 31 or the trough portions 32.

DESCRIPTION OF REFERENCE CHARACTERS

1 Plate Fin Heat Exchanger
2 Tube Plate
3 Corrugated Fin
30 Thin Plate Member
31 Crest Portion
32 Trough Portion
33 Intermediate Portion
34 Protruding Rib
35 Recessed Rib (Protruding Rib)
310 Contact Surface
320 Contact Surface
341 Gently Sloping Portion
351 Gently Sloping Portion
7 Fillet

The invention claimed is:

1. A plate fin heat exchanger comprising:
a corrugated fin having a crest portion having a crest line extending in a first direction, a trough portion having a trough line extending in the first direction, and an intermediate portion connecting the crest and trough portions together, the crest and trough portions being alternately arranged in a second direction orthogonal to the first direction;
tube plates disposed to sandwich the corrugated fin therebetween, the tube plates being configured so as to be bonded to the corrugated fin while being in contact with respective surfaces of the crest and trough portions of the corrugated fin, wherein
the intermediate portion of the corrugated fin has a plurality of protruding ribs protruding beyond a surface of the corrugated fin, extending between the crest and trough portions, and arranged in the first direction,
the surface of the crest portion being in contact with one of the tube plates and the surface of the trough portion being in contact with the other tube plate are configured as contact surfaces with no protruding rib,
the crest and trough portions are curved,
gently sloping portions are provided in the curved crest and trough portions between the protruding ribs and the contact surfaces to gradually protrude from the surface of the corrugated fin with increasing distance from the contact surfaces of the crest and trough portions, and are continuous with the protruding ribs along the curved crest and trough portions,
the corrugated fin and the tube plates are bonded together by brazing, and
fillets that are made of a brazing filler metal gathering during brazing are provided between the gently sloping portions and the tube plates.

2. The plate fin heat exchanger of claim 1, wherein
the corrugated fin is creased to provide a plurality of grooved projections and recesses, and
the projections or recesses provided by the creasing constitute the protruding ribs and the gently sloping portions.

3. The plate fin heat exchanger of claim 2, wherein
the grooved projections and recesses provided by the creasing extend on the corrugated fin in the second direction, and
the protruding ribs of the corrugated fin are orthogonal to the crest line of the crest portion and the trough line of the trough portion.

* * * * *